(No Model.)
L. MONTGILION.
POWER ACCUMULATOR FOR VEHICLES.
No. 310,907. Patented Jan. 20, 1885.
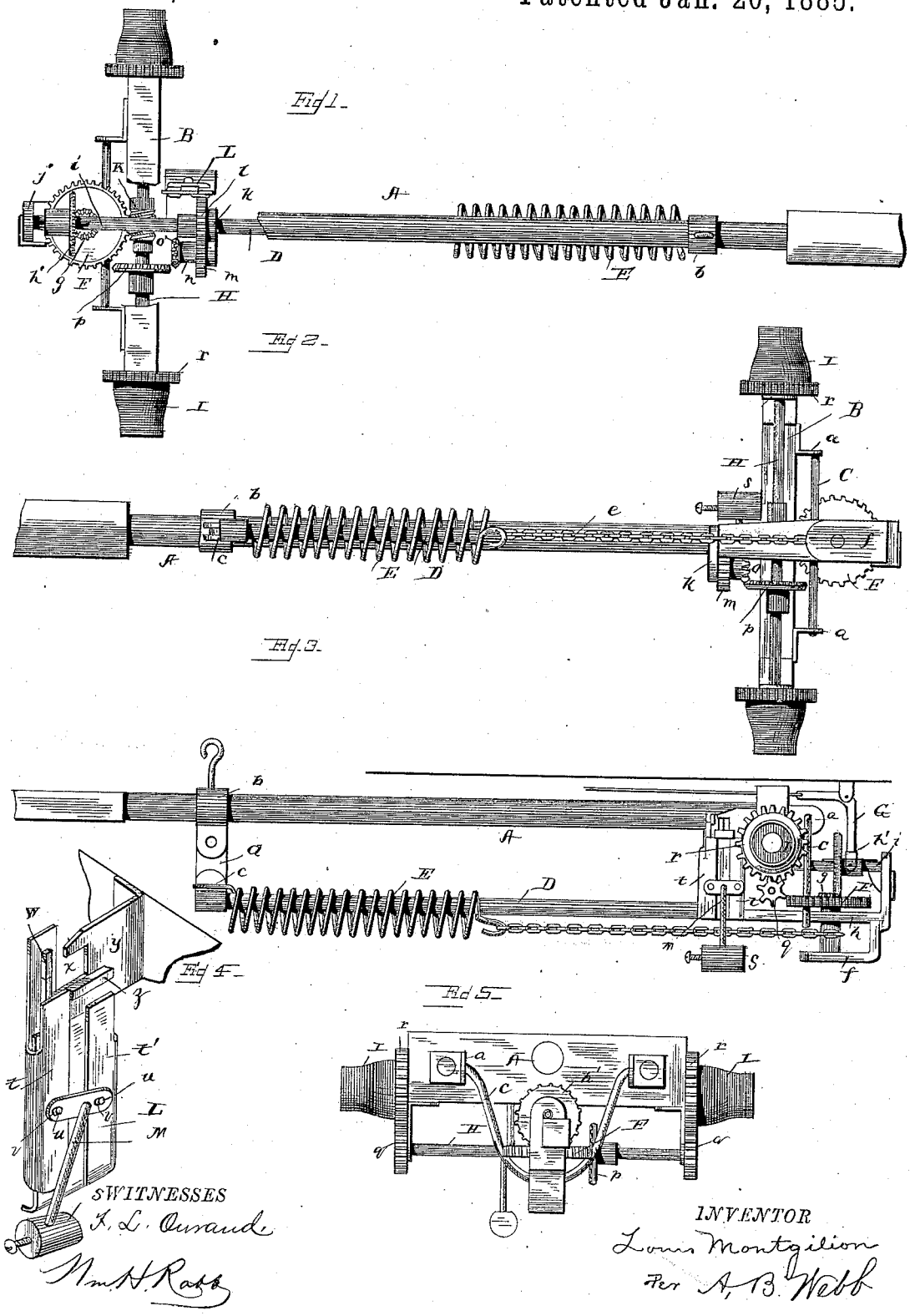
WITNESSES
INVENTOR
Louis Montgilion
Per A. B. Webb
Attorney

UNITED STATES PATENT OFFICE.

LOUIS MONTGILION, OF ELK RIDGE, MARYLAND.

POWER-ACCUMULATOR FOR VEHICLES.

SPECIFICATION forming part of Letters Patent No. 310,907, dated January 20, 1885.

Application filed October 29, 1884. (No model.)

*To all whom it may concern:*

Be it known that I, LOUIS MONTGILION, a citizen of the United States, residing at Elk Ridge, in the county of Howard and State of Maryland, have invented certain new and useful Improvements in Automatic Auxiliarators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in draft-equalizers for wagons and other vehicles; and it consists in the general construction and arrangement of the several operating parts, as will be hereinafter more fully set forth, the object thereof being to produce a simple, easily-constructed device of the character named, that will be automatic and effective in its operation to prevent sudden strain upon the team, and at the same time insure a steady forward motion of the vehicle. These objects I attain by the construction substantially as shown in the accompanying drawings, making part of this specification, in which—

Figure 1 represents a side elevation of my invention; Fig. 2, a top plan view; Fig. 3, a bottom plan view; Fig. 4, a detail view of the latch mechanism, and Fig. 5 a rear view of the axle.

The letter A represents the reach, and B the rear axle, of a vehicle, the latter provided with ears $a$, and the former with an adjustable clip, $b$.

To the ears $a$ upon the rear of the axle B are loosely connected the ends of a rod or strap, C, which is rigidly secured to and forms a bearing for a frame or carriage containing the operative parts of the device located beneath and adjacent to said axle.

Connected to and extending in a forward direction from the frame or carriage is a rod, D, the extremity of which is formed with lugs $c$, to which is pivotally connected one end of a link, $d$, having its other end also pivotally connected to the adjustable clip $b$ upon the reach A.

Placed around the rod D, and its forward end secured to the lugs $c$, is a spiral spring, E, of any suitable power, its rear end being adjustably connected by means of a chain, $e$, to the shaft of a main gear-wheel, F, journaled in bearings formed in the bed-piece $f$, and rear angular extension, $h$, of the carriage or frame. This main gear-wheel F has formed therewith a small central pinion-wheel, $g$, which meshes with a gear-wheel, $h'$, feathered upon a shaft, $i$, having bearing in the rear and front extensions, $j$ $k$, of the carriage or frame, said gear-wheel being thrown in and out of mesh with the pinion $g$ by means of a bell-crank lever, G, suitably secured to the vehicle-body and adapted to be operated by the driver. The forward end of the shaft $i$ has secured thereto another gear-wheel, $l$, meshing with a similar one, $m$, secured to a short rod or journal, $n$, extending rearward from the front angular extension, $k$, of the frame or carriage, the sleeve $o$ of this latter gear being formed with cog-teeth adapted to mesh with a gear-wheel, $p$, secured to a shaft, H, parallel with and hung in bearings secured to the under side of the axle B, the ends of said rod being provided with spur-wheels $q$, to mesh with gears $r$, secured upon the hubs I of the vehicle-wheels in place of the usual hub-bands, and a centrally-located worm-wheel, K, adapted to be thrown in and out of gear with the main wheel F.

To one side of the frame or carriage, at its forward end, is an upwardly-extended angle-piece, L, having pivotally secured thereto a T-shaped lever, M, adapted to receive an adjustable counter-weight, $s$. To this angle-piece of the frame or carriage are loosely connected latch-pieces $t$ $t'$, having each upon its outer side a lug, $u$, adapted to engage slots $v$ in the head of the T-shaped lever M. The forward latch-piece, $t$, upon its rear side, is extended in an upward direction and formed with a lug, $w$, which engages a slot, $x$, in an ear, $y$, secured to the front of the axle B, said ear having upon its outer side a projection, $z$, which acts as a stop for the latch-pieces as they are alternately raised by the action of the weighted lever M.

In the operation of my invention, when the vehicle to which it is attached is in the act of descending a grade or incline of the road, the main frame or carriage, being hung in loose bearings, swings forward, thereby throwing the main gear-wheel into mesh with the worm-wheel upon the shaft H, the weighted lever at the same time causing the forward latch-piece to engage the stop upon the projection of the axle, thereby retaining the operative parts of the device in this new position. The revolution of the main gear-wheel causes the chain to wind around the shaft of the former as the vehicle proceeds, and thus draws back the spring, which, in conjunction with the additional friction consequent to the present relative position of the operative parts, compensates for the usual increased impetus incident to a vehicle descending an inclination. When the vehicle reaches the foot of the incline, the weighted lever causes the forward latch-piece to automatically disengage itself with the stop, thereby allowing the frame or carriage to swing back, and thus throw the main gear-wheel out of mesh with the worm upon the shaft H, and the cog-toothed end of the sleeve o into gear with the gear-wheel secured upon said shaft, thus transmitting the power of the spring, as the same is gradually let off, to the vehicle-wheels through the medium of the spur-wheels and toothed hub-bands, thereby preventing the sudden jerk and strain upon the team common to vehicles of the ordinary construction.

To prevent the rewinding of the chain while the vehicle is upon a level or upgrade after the spring has entirely recoiled, the gear-wheel feathered upon the shaft $i$, and meshing with the pinion $g$, is thrown out of gear by means of the bell-crank lever operated by the driver, and retained in this position until another downgrade is reached, when the several parts are allowed to assume their relative positions and the operation repeated.

The device is not only applicable as a draft-equalizer for vehicles, but may also be readily applied to cars to perform the functions of a starter and equalizer.

Having now described my invention, what I claim, and desire to secure by Letters Patent, is—

1. A draft-equalizer for vehicles, consisting of a loosely-hung carriage or frame, a system of gearing arranged therein, a suitable spring flexibly connected with relation to said gearing, a shaft at right angles to the frame or carriage, and provided with a worm, gear, and spur wheels, toothed hub-bands, and an automatic latch mechanism, all constructed and arranged to operate substantially as and for the purpose described.

2. In combination with the rear axle, toothed hub-bands, and reach of a vehicle, a carriage or frame hung in loose bearings and containing a system of gearing, a shaft located beneath and parallel with said axle and constructed with a worm, gear, and spur wheels, a suitable spring arranged and connected with relation to the main gear of the frame or carriage, and a latch mechanism, substantially as shown and described.

3. A loosely-hung frame or carriage having a forward-extended rod and front and rear angular extensions, in combination with a system of gearing arranged and supported therein, an automatic latch mechanism, flexibly-connected spring, a shaft provided with a worm, gear, and spur wheels, and toothed hub-bands, arranged to operate in the manner as and for the purpose set forth.

4. An automatic latch mechanism consisting of two sliding latch-pieces arranged upon an upright, a weighted lever connected pivotally to said latch-pieces, and an ear having a slot at its upper forward end and a stop upon its outer side, in combination with a frame or carriage loosely hung to the rear axle and reach of a vehicle and supporting a system of gearing, substantially as and for the purpose set forth.

5. In combination with the rear axle and reach of a vehicle, a frame or carriage loosely hung thereto and provided with a front and rear extension, a main gear-wheel, F, having a pinion, $g$, shaft $i$, gear-wheel $h$ $l$, shaft H, constructed with worm K, gear-wheel $p$, and spur-wheels $q$, cog-toothed sleeve $o$, and gear $m$, toothed hub-bands $r$, forward-extended rod D, flexibly-connected spring E, and latch mechanism, all arranged to operate substantially as and for the purpose described.

In testimony whereof I have affixed my signature in presence of two witnesses.

LOUIS MONTGILION.

Witnesses:
JAS. A. TAIT,
WM. B. MARCHE.